United States Patent
Sauer et al.

(10) Patent No.: US 10,188,248 B2
(45) Date of Patent: *Jan. 29, 2019

(54) VACUUM CLEANER FILTER BAG

(75) Inventors: Ralf Sauer, Overpelt (BE); Jan Schultink, Overpelt (BE)

(73) Assignee: Eurofilters Holding N.V., Overpelt (BE)

( * ) Notice: Subject to any disclaimer, the term of this patent is extended or adjusted under 35 U.S.C. 154(b) by 1060 days.

This patent is subject to a terminal disclaimer.

(21) Appl. No.: 13/635,089

(22) PCT Filed: Mar. 9, 2011

(86) PCT No.: PCT/EP2011/001164
§ 371 (c)(1),
(2), (4) Date: Nov. 16, 2012

(87) PCT Pub. No.: WO2011/113543
PCT Pub. Date: Sep. 22, 2011

(65) Prior Publication Data
US 2013/0055900 A1   Mar. 7, 2013

(30) Foreign Application Priority Data

Mar. 19, 2010 (EP) .................................. 10002964
May 20, 2010 (EP) .................................. 10163462
May 20, 2010 (EP) .................................. 10163463

(51) Int. Cl.
*A47L 9/14* (2006.01)
*B01D 46/52* (2006.01)
*A47L 11/40* (2006.01)

(52) U.S. Cl.
CPC .............. *A47L 9/14* (2013.01); *A47L 9/1436* (2013.01); *A47L 11/4019* (2013.01); *B01D 46/523* (2013.01)

(58) Field of Classification Search
CPC ....... B01D 46/523; B01D 46/521; A47L 9/14; A47L 9/1436
(Continued)

(56) References Cited

U.S. PATENT DOCUMENTS

| 1,859,861 A | * | 5/1932 | Ballou | ..... A47L 9/14 55/368 |
| 1,878,384 A | * | 9/1932 | Davidson | ..... A47L 9/14 55/365 |

(Continued)

FOREIGN PATENT DOCUMENTS

| CN | 101360443 A | 2/2009 | | |
| DE | 484759 C | * 10/1929 | ............... | A47L 9/14 |

(Continued)

OTHER PUBLICATIONS

Abhisehk et al, "Design of Pleated Filter Bag Filter System for Particulate Emission Control in Cement Industry", Aug. 2015, International Research Journal of Engineering and Technology, vol. 2, Issue 5.*

(Continued)

*Primary Examiner* — Robert Clemente
(74) *Attorney, Agent, or Firm* — Brinks Gilson & Lione

(57) ABSTRACT

The invention relates to a vacuum cleaner filter bag, including a bag wall which is made of filter material and has a through-passage through which the air to be cleaned can flow into the vacuum cleaner filter bag, in which the bag wall includes an at least partially pleated non-woven fabric material and the bag wall includes a first and a second filter material layer which are joined to one another by a peripheral weld seam, wherein the first and/or second filter material layers comprise include the at least partially pleated non-woven fabric material.

16 Claims, 6 Drawing Sheets

(58) Field of Classification Search
USPC ......... 55/309, 367, 368, 372, 374, 382, 486, 55/521, DIG. 2, DIG. 5; 15/347, 352, 15/353; 96/222, 223, 226, 227; 156/515, 156/518, 530, 581

See application file for complete search history.

(56) References Cited

U.S. PATENT DOCUMENTS

| | | | | |
|---|---|---|---|---|
| 2,514,280 A * | | 7/1950 | Hammell | A47L 9/14 15/327.1 |
| 2,792,076 A * | | 5/1957 | Meyerhoefer | A47L 9/14 55/368 |
| 3,107,989 A | | 10/1963 | Fesco | |
| 3,416,721 A | | 12/1968 | Fesco | |
| 3,430,843 A | | 3/1969 | Fesco | |
| 3,596,443 A | | 8/1971 | Goldberg | |
| 3,710,948 A * | | 1/1973 | Sexton | B01D 46/02 210/484 |
| 4,125,219 A * | | 11/1978 | Engen | A47L 9/14 55/382 |
| 4,145,196 A * | | 3/1979 | Alskog | B01D 46/02 210/315 |
| 4,539,027 A | | 9/1985 | Fornas et al. | |
| 4,746,339 A * | | 5/1988 | Millard | B01D 46/0001 210/493.2 |
| 5,181,946 A * | | 1/1993 | Bosses et al. | 55/381 |
| 5,401,446 A | | 3/1995 | Tsai et al. | |
| 6,156,086 A * | | 12/2000 | Zhang | A47L 9/14 428/36.1 |
| 6,379,409 B1 * | | 4/2002 | Dijkman | A47L 9/14 156/510 |
| 6,802,879 B2 | | 10/2004 | Scanlon | |
| 6,814,773 B2 * | | 11/2004 | Shah | B01D 46/0004 55/496 |
| 7,018,493 B2 * | | 3/2006 | Altmeyer et al. | 156/73.1 |
| 7,611,555 B2 | | 11/2009 | Wattenberg et al. | |
| 7,799,107 B2 | | 9/2010 | Corney et al. | |
| 7,981,177 B2 * | | 7/2011 | Ogale | 55/382 |
| 8,062,396 B2 * | | 11/2011 | Amano | B01D 39/1623 55/302 |
| 8,066,803 B2 * | | 11/2011 | Sauer | A01N 25/34 55/382 |
| 8,097,054 B2 * | | 1/2012 | Schultink | A47L 9/14 15/347 |
| 8,157,881 B1 * | | 4/2012 | Anoszko | B01D 46/0005 55/481 |
| 8,372,174 B2 * | | 2/2013 | Schultink et al. | 55/365 |
| 8,702,827 B2 * | | 4/2014 | Schultink et al. | 55/309 |
| 8,702,828 B2 * | | 4/2014 | Schultink et al. | 55/309 |
| 8,758,465 B2 | | 6/2014 | Schultink et al. | |
| 2002/0011051 A1 * | | 1/2002 | Schultheib | B01D 39/1623 55/382 |
| 2002/0166449 A1 * | | 11/2002 | Scanlon | 95/273 |
| 2004/0157045 A1 * | | 8/2004 | Davenport | 428/193 |
| 2005/0204714 A1 * | | 9/2005 | Sundet | B01D 46/0001 55/497 |
| 2006/0005518 A1 * | | 1/2006 | Duffy | B01D 46/523 55/497 |
| 2006/0102275 A1 | | 5/2006 | Poulsen | |
| 2006/0144042 A1 * | | 7/2006 | Kadlicko | F04B 1/145 60/487 |
| 2008/0017036 A1 | | 1/2008 | Schultink et al. | |
| 2008/0047430 A1 * | | 2/2008 | Kobori | D04H 1/54 95/283 |
| 2008/0099053 A1 * | | 5/2008 | Loveless | A47L 7/0004 134/21 |
| 2008/0115671 A1 * | | 5/2008 | Sauer | A01N 25/34 96/223 |
| 2008/0257149 A1 | | 10/2008 | Ogale | |
| 2008/0314005 A1 * | | 12/2008 | Sauer | A47L 9/14 55/368 |
| 2008/0314011 A1 * | | 12/2008 | Smithies | B01D 39/1623 55/521 |
| 2009/0301043 A1 * | | 12/2009 | Rosemeier | A47L 9/14 55/382 |
| 2009/0308032 A1 * | | 12/2009 | Schultink | A47L 9/14 55/382 |
| 2011/0047945 A1 * | | 3/2011 | Schultink | A47L 9/102 55/368 |
| 2011/0206564 A1 * | | 8/2011 | Parent | B01D 39/1623 422/177 |
| 2011/0265283 A1 * | | 11/2011 | Duncan | A47L 9/14 15/347 |
| 2012/0005997 A1 * | | 1/2012 | Davies | B01D 46/023 55/381 |
| 2013/0047563 A1 * | | 2/2013 | Sauer et al. | 55/378 |

FOREIGN PATENT DOCUMENTS

| | | | |
|---|---|---|---|
| DE | 656164 C * | 1/1938 | A47L 9/125 |
| DE | 1403128 A1 * | 11/1968 | A47L 9/14 |
| DE | 1503726 A1 * | 5/1969 | A47L 9/14 |
| DE | 1703030 A1 * | 1/1972 | A47L 9/0072 |
| DE | 3 129 371 A1 | 2/1983 | |
| DE | 4227744 A1 | 2/1994 | |
| DE | 297 04 079 U1 | 6/1997 | |
| DE | 197 13 238 A1 | 10/1998 | |
| DE | 298 14 830 U1 | 11/1998 | |
| DE | 198 20 153 C1 | 12/1999 | |
| DE | 201 01 466 U1 | 5/2001 | |
| DE | 100 64 608 A1 | 4/2002 | |
| DE | 20 2005 000 918 U1 | 5/2005 | |
| DE | 103 48 375 A1 | 5/2005 | |
| DE | 10 2004 009 956 A1 | 9/2005 | |
| DE | 20 2005 010 357 U1 | 10/2005 | |
| DE | 20 2005 016309 U1 | 1/2006 | |
| DE | 20 2006 016 303 U1 | 1/2007 | |
| DE | 20 2006 016 304 U1 | 1/2007 | |
| DE | 20 2006 019 108 U1 | 3/2007 | |
| DE | 20 2007 000 198 U1 | 4/2007 | |
| DE | 20 2005 021300 U1 | 8/2007 | |
| DE | 20 2007 010 692 U1 | 11/2007 | |
| DE | 10 2006 023 707 B3 | 1/2008 | |
| DE | 102006023707 B3 * | 1/2008 | A47L 9/14 |
| DE | 102006051117 B3 * | 1/2008 | A47L 9/14 |
| DE | 20 2008 003248 U1 | 6/2008 | |
| DE | 20 2008 007 717 U1 | 9/2008 | |
| DE | 202008008989 U1 * | 9/2008 | A47L 9/14 |
| DE | 20 2008 016 300 U1 | 4/2009 | |
| DE | 10 2007 060 747 A1 | 6/2009 | |
| DE | 10 2007 060 748 A1 | 6/2009 | |
| DE | 20 2009 004 433 U1 | 7/2009 | |
| DE | 10 2008 006769 A1 | 8/2009 | |
| DE | 20 2008 006 904 U1 | 11/2009 | |
| DE | 20 2009 002970 U1 | 11/2009 | |
| DE | 20 2009 012 839 U1 | 1/2010 | |
| DE | 102008045683 A1 * | 3/2010 | A47L 9/14 |
| DE | 102009009152 A1 * | 8/2010 | A47L 9/14 |
| EP | 0 161 790 A2 | 11/1985 | |
| EP | 0 338 479 A1 | 10/1989 | |
| EP | 0 639 061 B1 | 5/1997 | |
| EP | 0 898 997 A1 | 3/1999 | |
| EP | 0 960 645 A2 | 12/1999 | |
| EP | 1 059 056 A1 | 12/2000 | |
| EP | 1 080 770 A2 | 3/2001 | |
| EP | 1 192 890 A2 | 4/2002 | |
| EP | 1 212 971 A2 | 6/2002 | |
| EP | 1 661 500 A1 | 5/2006 | |
| EP | 1 683 460 A1 | 7/2006 | |
| EP | 1 776 909 A1 | 4/2007 | |
| EP | 1 787 560 A1 | 5/2007 | |
| EP | 1 849 392 A1 | 10/2007 | |
| EP | 1 915 938 A1 | 4/2008 | |
| EP | 1 982 625 A2 | 10/2008 | |
| EP | 2 067 427 A2 | 6/2009 | |
| EP | 2 098 153 A1 | 9/2009 | |
| EP | 2133017 A1 * | 12/2009 | A47L 9/14 |
| EP | 2215951 B1 * | 1/2012 | A47L 9/102 |
| EP | 2489292 A1 * | 8/2012 | A47L 9/14 |
| EP | 2662010 A1 * | 11/2013 | B01D 46/52 |
| EP | 2311360 B1 * | 9/2014 | A47L 9/14 |

(56) References Cited

FOREIGN PATENT DOCUMENTS

| EP | 2452603 B1 * | 10/2015 | ............ A47L 9/14 |
|---|---|---|---|
| GB | 879188 A | 10/1961 | |
| GB | 1 594 700 | 8/1981 | |
| JP | 2000 350685 A | 12/2000 | |
| JP | 2001 204661 A1 | 7/2001 | |
| WO | WO 95/16383 A1 | 6/1995 | |
| WO | WO 00/00269 A1 | 1/2000 | |
| WO | WO 00/64320 A1 | 11/2000 | |
| WO | WO 2005/034708 A1 | 4/2005 | |
| WO | WO 2005/060807 A1 | 7/2005 | |
| WO | WO 2006/025249 A1 | 3/2006 | |
| WO | WO 2007/059939 A1 | 5/2007 | |
| WO | WO 2010/000453 A1 | 1/2010 | |

OTHER PUBLICATIONS

Chen et al, "Optimization of Pleated Filter Designs Using a Finite-Element Numerical Model", 1995, Aerosol Science and Technology 23, pp. 579-590.*

Wiegmann et al, "Design of Pleated Filters by Computer Simulations", 2009.*

International Search Report for International Application No. PCT/EP2011/001164, dated Jan. 6, 2011.

* cited by examiner

VACUUM CLEANER FILTER BAG

This application claims the benefit under 35 U.S.C. § 371 of International Application No. PCT/EP2011/001164, filed Mar. 9, 2011, which claims the benefit of European Patent Application No. 10002964.4, filed Mar. 19, 2010, European Patent Application No. 10163462.4, filed May 20, 2010, and European Patent Application No. 10163463.2, filed May 20, 2010, which are incorporated by reference herein in their entirety.

FIELD OF THE INVENTION

The invention relates to a vacuum cleaner filter bag with a bag wall made of filter material which has a through-passage through which the air that is to be cleaned can flow into the vacuum cleaner filter bag.

BACKGROUND

Vacuum cleaner filter bags are predominantly made of nonwovens today. Due to their excellent dust-holding capacity, vacuum cleaner filter bags made of nonwovens have practically replaced filter bags made of paper. The manufacture of filter bags made of nonwovens fundamentally differs from the manufacture of paper bags. Rectangular flat bags that are formed from an upper and a lower layer that are welded on the edge around the periphery are common. Filter bags of that kind are known, for example, from DE 201 01 466, EP 0 161 790, EP 0 639 061, EP 1 059 056 or EP 1 661 500.

The positive characteristics of vacuum cleaner filter bags made of nonwovens can to some extent not be used because of an inadequate fit. For this reason, complex bag geometric shapes were developed in order to optimally use the installation space in the vacuum cleaner.

To obtain a greater filling volume than that of a purely flat bag, for instance, flat bags with a weld seam around the periphery and unfoldable side folds are used. Such filter bags are known, for example, from DE 20 2005 000 918, DE 10 2008 006769, DE 20 2009 012 839 or DE 10 2006 023 707.

In addition to flat bags, occasionally block bottom bags are also used. Block bottom bags made of a nonwoven are complex to manufacture. Block bottom bags are known, for example, from DE 20 2005 016309, DE 20 2007 000 198, DE 20 2007 017 064, DE 20 2009 004 433 or EP 1 677 660.

Various solutions have been proposed to increase the dust-holding capacity of vacuum cleaner filter bags.

A pre-filtration by means of loose fibres is disclosed, for example, in DE 10 2007 060 747, DE 20 2007 010 692 and WO 2005/060807. A pre-filtration by means of a filter bag in the filter bag was disclosed by WO 2010/000453, DE 20 2009 002 970 and DE 20 2006 016 303. Flow deflections or flow distributions in the filter bag are proposed, for example, by EP 1 915 938, DE 20 2008 016 300, DE 20 2008 007 717, DE 20 2006 019 108, DE 20 2006 016 304, EP 1 787 560 and EP 1 804 635.

DE 10 2007 060 748 discloses a filter bag in which the fleece material is stretched to form a three-dimensionally shaped bag wall.

EP 1 982 625 discloses a filter bag, whereby the filter material is embossed at least in areas and the effective filter area is enlarged by means of a profiling of the filter material. The profiling can be executed in the form of elongated ribs arranged parallel to one another. By means of the embossing with a pattern, however, the material characteristics and/or the filtration characteristics of the embossed nonwoven layer are modified DE 20 2005 010 357 discloses a dust filter bag, whereby the bag wall has at least one layer of filter material, whereby at least one layer consists of creped fibre material. A coarse filter layer, a fine filter layer or all layers of the bag can thereby be creped. As a result of the creping, the at least one layer is irregularly creased, whereby the volume per unit area of the corresponding filter layer is enlarged. As a result of the creping, the mass per unit area of the filter layer and consequently its filtration characteristics are modified.

Filter materials are known that are used in a folded manner in order to enlarge the effective surface, whereby the folds are fixed/stabilized. For example, EP 1 080 770 discloses a zigzag-shaped folded fold pack made of a nonwoven that can be thermoplastically welded. Prefabricated strips for stabilizing the folds are known from DE 42 27 744, whereby these strips are connected to the fold edges by melting the strip and/or filter web material. Such filter materials have been used until now for air filtration, but not for vacuum cleaner filter bags.

BRIEF SUMMARY

In spite of the abovementioned improvements, several problems with vacuum cleaner filter bags have not been solved satisfactorily as of yet. As the filling degree of the filter bag increases, the volume flow that is conveyed through the vacuum cleaner is continuously reduced. The dust intake, and consequently the cleaning effect, of a vacuum cleaner is consequently less in the case of a partially filled vacuum cleaner bag than in the case of an empty bag. This reduction of the suction power is particularly strong in the case of filter bags with a high level of filtration.

The object of the present invention is to provide a vacuum cleaner filter bag that has a large dust-holding capacity.

The invention provides a vacuum cleaner filter bag with a bag wall made of filter material that has a through-passage through which the air that is to be cleaned can flow into the vacuum cleaner filter bag, in which the bag wall comprises an at least partially pleated nonwoven material and the bag wall comprises a first and a second filter material layer that are joined to one another by a peripheral weld seam, whereby the first and/or the second filter material layer comprises the at least partially pleated nonwoven material.

This vacuum cleaner filter bag according to the invention is formed as a flat bag.

Due to the at least partially pleated nonwoven material, the surface available for the filtration of the air that is to be cleaned can be enlarged, as a result of which an increased dust-holding capacity is achieved.

The pleated nonwoven material has a plurality of, particularly two or more, predetermined folds. In other words, the at least partially pleated nonwoven material corresponds to an at least partially crimped or corrugated nonwoven material.

A fold leg of a first fold of the at least partially pleated nonwoven material can border directly on a fold leg of a second fold of the at least partially pleated nonwoven material. In other words, the folds of the at least partially pleated nonwoven material can be attached directly to one another or they can abut one another or they can touch one another.

The folds of the pleated nonwoven material can particularly have a zigzag shape. In other words, a first fold of the pleated nonwoven material can correspond to a mirroring of a second fold along a perpendicular plane between the two folds.

The at least partially pleated filter material can particularly have more than 5, 10, 20, 30, 40 or 50 directly abutting folds.

One or more of the folds can be formed so as to be reclined or upright. To be understood as reclined folds are folds whose fold legs are arranged essentially parallel to an outer surface of the bag wall. To be understood as upright folds are folds whose fold legs, with an outer surface of the bag wall, enclose an angle greater than 0° and less than 180°, particularly greater than 20° or greater than 45°.

The at least partially pleated nonwoven material can comprise one or more layers of nonwoven material.

The bag wall of the vacuum cleaner filter bag can comprise one or more layers of nonwoven material, particularly whereby one or more layers of the bag wall comprise at least partially pleated nonwoven material or consist of an at least partially pleated nonwoven material. The bag wall can also consist of one or more layers of at least partially pleated nonwoven material.

A bag wall comprising at least partially pleated nonwoven material is to be distinguished from a bag wall with one or two side folds. While "pleated" is a characteristic of the nonwoven material of the bag wall, a side fold is a feature, manufactured during the shaping of the bag, of the bag wall.

A bag wall comprising at least partially pleated nonwoven material is also to be distinguished from a bag wall comprising a creped or profiled nonwoven material. In contrast to creping a nonwoven material or profiling the nonwoven material by means of embossing, the material characteristics of the nonwoven material as such are not changed by means of the pleating. Pleating the nonwoven material only changes the arrangement of the nonwoven material.

In contrast to creping, periodic, particularly predetermined, folds are furthermore formed during pleating.

The folds of the at least partially pleated nonwoven material can be arranged in a predetermined area of the bag wall, for example, across the entire area or across subareas of the surface of the bag wall available for the filtration of the air that is to be cleaned.

The bag wall can also comprise a fully pleated nonwoven material or it can consist of a fully pleated nonwoven material.

Folds of the at least partially pleated nonwoven material can extend across the entire length or width of the vacuum cleaner filter bag. In other words, folds of the at least partially pleated nonwoven material can run, particularly continuously, from a first side of the vacuum cleaner filter bag formed by an edge to a second side of the vacuum cleaner filter bag, this second side lying opposite the first side and being formed by an edge.

The first and/or the second filter material layer can each comprise one or more layers of nonwoven material.

Equivalently, the vacuum cleaner filter bag can also be formed as a tubular bag. The bag wall can thereby be manufactured from a filter material layer, whereby two, particularly opposite, edges of the filter material layer are connected, as a result of which a tube is formed. By closing the open ends of the tube by means of transverse weld seams, a tubular bag is obtained. The connection of the edges during the forming of the tube and/or the closing of the open ends of the tube can take place by means of ultrasonic welding and/or by means of thermal welding and/or by means of gluing.

The filter material layer can comprise one or more layers of nonwoven material.

The folds of the at least partially pleated nonwoven material can have a fold height between 3 mm and 100 mm, particularly between 3 mm and 50 mm, particularly between 5 mm and 15 mm. The fold height can also be greater than 100 mm. This can particularly be the case in the event of large (volume of more than 10 liters), particularly commercially used, vacuum cleaner filter bags.

The folds of the pleated nonwoven material can have a fold width between 3 mm and 100 mm, particularly between 3 mm and 50 mm, particularly between 5 mm and 15 mm. The fold width can also be greater than 100 mm. This can particularly be the case in the event of large (volume of more than 10 liters), particularly commercially used, vacuum cleaner filter bags.

At least two folds of the pleated nonwoven material can have fold heights and/or fold widths that differ from one another. Alternatively, all folds of the at least partially pleated nonwoven material can have the same fold heights and/or fold widths.

The vacuum cleaner filter bag can furthermore comprise at least one side fold, particularly whereby the pleated nonwoven material is arranged in the at least one side fold. Thus, it is possible for one or more folds of the at least partially pleated nonwoven material to be arranged on at least one fold leg of the at least one side fold.

At least two folds of the pleated nonwoven material can have fold shapes that differ from one another.

Each of the folds of the at least partially pleated nonwoven material can comprise a first and a second fold leg. The first and the second fold legs can have the same length or different lengths. An edge at which the fold legs meet can be formed by means of a folded line.

In principle, all materials known for the manufacture of vacuum cleaner filter bags come into consideration as materials for the bag wall, particularly for the at least partially pleated nonwoven material.

A dry- or wet-laid nonwoven or an extrusion nonwoven, particularly a meltblown nonwoven or spunbond nonwoven can be used as the nonwoven material. The differentiation between wet-laid nonwovens and conventional wet-laid paper is made according to the definition given above, such as is also used by the International Association Serving the Nonwovens and Related Industries (EDANA). A conventional (filter) paper is consequently not a nonwoven.

The nonwoven can comprise staple fibres or endless fibres. In terms of manufacturing, it is also possible to provide a plurality of layers of staple fibres or endless fibres that are compacted into exactly one layer of nonwoven.

For example, the bag wall, particularly the at least partially pleated nonwoven material, can comprise a laminate of spunbond nonwoven, meltblown nonwoven and spunbond nonwoven (SMS). This laminate can be laminated by means of a hot adhesive or it can be calendered. The layer made of meltblown nonwoven can be creped.

The term nonwoven is used in accordance with the definition given in the ISO standard ISO 9092:1988 and the CEN standard EN29092, respectively. In particular, the terms fibrous web or fleece and nonwoven in the field of the manufacture of nonwovens are distinguished from one another as follows, and are also to be understood in this way in the context of the present invention. Fibres and/or filaments are used to manufacture a nonwoven. The loose or unattached and still unbonded fibres and/or filaments are called fleece or fibrous web. A so-called fleece binding step turns such a fibrous web into a nonwoven that has sufficient strength in order, for example, to be wound up into rolls. In other words, a nonwoven is formed by means of the compaction to be self-supporting. (Details on the use of the definitions and/or methods described herein can also be found in the standard work "Vliesstoffe", W. Albrecht, H. Fuchs, W. Kittelmann, Wiley-VCH, 2000/"Nonwoven Fabrics", W. Albrecht, H. Fuchs, W. Kittelmann, Wiley-VCH, 2002.)

The at least partially pleated nonwoven material can have a mass per unit area of less than 250 $g/m^2$, particularly less than 200 $g/m^2$, particularly between 25 $g/m^2$ and 150 $g/m^2$.

The at least partially pleated nonwoven material can, however, also have a mass per unit area of greater than 250 $g/m^2$. This can be the case particularly for commercial vacuum cleaner filter bags, depending on the mechanical requirement.

The folds of the pleated nonwoven material can be connected to one another at least partially by means of a fixing device. The folds of the at least partially pleated nonwoven material can be held at a predetermined distance from one another by means of the fixing device.

The fixing device can be arranged on the upstream side or on the downstream side of the at least partially pleated nonwoven material. On the upstream side here means facing towards the interior of the vacuum cleaner filter bag, while on the downstream side means facing towards the exterior of the vacuum cleaner filter bag.

The fixing device can be at least partially glued and/or welded to the folds of the at least partially pleated nonwoven material. In particular, the fixing device can be glued and/or welded at points at which fold legs of two different folds of the at least partially pleated nonwoven material abut.— Alternatively or additionally, the fixing device can be glued and/or welded on to the fold backs of the folds. The edge of a fold at which the two fold legs of the fold abut or are in contact with each other can be called the fold back.

It is also possible for two or more folds of the at least partially pleated nonwoven material to be connected to one another by means of the fixing device, while two or more folds of the pleated nonwoven material are not connected to one another by means of the fixing device.

Alternatively or additionally, the fixing device can be glued and/or welded to one or more folds of the at least partially pleated nonwoven material in such a way that the connection detaches during the operation of the vacuum cleaner filter bag. In this way, it is possible to influence the airflow within the vacuum cleaner filter bag by means of the at least partially detaching fixing device. In other words, parts of the fixing device can be used as air distributors during the operation of the vacuum cleaner filter bag.

Additionally or alternatively, the vacuum cleaner filter bag can comprise at least one element for flow deflection or flow distribution in the vacuum cleaner filter bag. An element of this kind is known, for example, from EP 1 787 560 or EP 1 804 635. For example, such an element can be formed in the form of at least one material strip mounted on the bag wall in the interior of the vacuum cleaner filter bag.

The fixing device can be formed in such a way that it keeps the fold width of the folds that are connected to one another by means of the fixing element constant during the operation of the vacuum cleaner filter bag.

Alternatively or additionally, the fixing device can have a predetermined expansion behaviour. In other words, the fixing device can be formed in such a way that the fold width of the folds connected by the fixing device can be enlarged during the operation of the bag by means of expanding the fixing device. The fixing device can have an elasticity that is selected in such a way that the fixing device returns to its original form after the operation of the vacuum cleaner filter bag, meaning after the vacuum cleaner has been switched off.

The fixing device can also be formed partially, particularly in subareas, by expandable material strips and partially, particularly in other subareas, by non-expandable material strips.

The fixing device can comprise at least one material strip, particularly a nonwoven material strip. A plurality of material strips can be arranged at a distance to one another or they can border one another directly.

A plurality of material strips can run crosswise, particularly perpendicularly or at a predetermined angle, to the longitudinal direction of the folds. The predetermined angle can be greater than 0° and less than 180°, particularly greater than 30° and less than 150°.

The material of the fixing device can have a high level of air permeability. If the material of the fixing device is not permeable to air, the fixing device can be formed such that it is perforated or slit.

The fixing device can be formed in the form of at least one continuous adhesive strip. In particular, a hot-melt adhesive can be used as the adhesive.

The at least one material strip can have a width of 0.5 cm to 4 cm, particularly 1 cm to 3 cm, for example, 2 cm. The at least one material strip can have a thickness of 0.1 mm to 10 mm, particularly 0.3 mm to 4 mm.

The fixing device can be formed in the form of one or two material strips, whose width and/or length corresponds to the width and/or length of the bag wall. In other words, the fixing device can be formed across the entire surface.

The fixing device can comprise a nonwoven material, a foil and/or a paper.

Spunbond nonwovens, carded or air-laid nonwovens and/or laminates of a plurality of nonwovens, for example, are possible for the nonwoven material for the fixing device. In the case of laminates of a plurality of nonwovens, the different nonwoven layers can have a gradient in the pore diameter.

The fixing device can also be formed in the form of a weave or a net. In particular, the fixing device can be formed in the form of an extruded net. The mesh width of the net can thereby lie between 0.5 mm and 10 cm, particularly between 3 mm and 6 mm. The shape of the holes of the net can be square or rectangular. It is also possible for one or more holes of the net to be square and one or more holes of the net to be rectangular.

The fixing device can also comprise filaments, cables and/or yarns.

The fixing device can also correspond to a retaining plate of the vacuum cleaner filter bag. In other words, the folds of the at least partially pleated nonwoven material can be at least partially connected to one another by means of the retaining plate of the vacuum cleaner filter bag.

Two or more folds of the at least partially pleated nonwoven material can also be not connected to one another by means of a fixing device, meaning that each has a variable fold width. During the operation of the vacuum cleaner filter bag, the vacuum cleaner filter bag can unfold in dependence on the surrounding vacuum cleaner housing. Unbonded folds of the pleated nonwoven material can adapt to the surrounding housing during operation. Improved space utilization can be achieved because of this.

By means of a predetermined combination of one or more areas of the at least partially pleated nonwoven material in which the folds are not fixed and of one or more areas of the pleated nonwoven material in which the folds are fixed, it is possible to optimize a fitting to the geometric shape of an installation space of a vacuum cleaner.

A nonwoven material of the fixing element can have a mass per unit area of from 10 g/m² to 30 g/m².

The fixing device can also be executed as a prefilter layer. In other words, the fixing device itself can be formed as a filter layer. In this case, the mass per unit area of the fixing device can be less than 100 g/m². For example, the fixing device can correspond to a laminate of one or more spunbond nonwovens and of one or more meltblown nonwovens, particularly whereby the at least one meltblown nonwoven comprises electrostatically charged fibres.

Fibres and/or absorbents can be arranged in a hollow space formed by the fixing device and the fold legs of at least one fold of the at least partially pleated nonwoven material. The fibres can, in particular, be electrostatically charged fibres. In this way, it is possible to achieve an additional filter effect. The fibres can be coated. Possible for use as absorbents are, for example, porous polymers and/or activated charcoal. Absorbents on the basis of coated polymer fibres are disclosed, for example, by DE 10 2004 009 956 and EP 1 725 153. Possible for use as a porous polymer is, for example, network SDVB (styrene-divinyl benzene). Also possible for use as absorbents are impregnated activated charcoal, functionalized carbon, hydrophobic zeolites, hydrophobic, porous polymers, bentonites and/or crystalline organometallic complexes.

The bag wall, particularly the at least partially pleated nonwoven material and/or the fixing device, can be at least partially electrostatically charged. It is possible to electrostatically charge the fibres of the nonwoven material before the compaction and/or to electrostatically charge the nonwoven, meaning after the compaction.

The electrostatic charge can, for example, be achieved by means of a corona method. The fleece or the nonwoven is thereby guided along between two direct current electrodes for a corona discharge centred in a roughly 3.8 cm (1.5 inches) to 7.6 cm (3 inches) wide area. One of the electrodes can thereby have a positive direct voltage of 20 to 30 kV while the second electrode has a negative direct voltage of 20 to 30 kV.

Alternatively or additionally, the electrostatic charge can be generated in accordance with the teachings of U.S. Pat. No. 5,401,446.

The vacuum cleaner filter bag can be a flat bag. In other words, the vacuum cleaner filter bag can be formed in such a manner that it does not have a block bottom.

Alternatively, the vacuum cleaner filter bag can also be formed as a block bottom bag. A folded bottom whose function normally consists of stabilizing the filter bag and forming a three-dimensional bag is called a block bottom. An example of a block bottom filter bag is known from DE 20 2005 016 309.

The vacuum cleaner filter bag can particularly be a disposable vacuum cleaner filter bag.

The filter bag can furthermore comprise a retaining plate that is used to fix the vacuum cleaner filter bag in a chamber of a vacuum cleaner and that is arranged in the area of the inlet opening. In particular, the retaining plate can be manufactured from a plastic. The retaining plate can be connected to the bag wall and have a through hole in the area of the inlet opening.

The inlet opening and the retaining plate can be arbitrarily positioned on the surface of the bag wall of the vacuum cleaner filter bag. For example, the inlet opening and the retaining plate can be arranged centred on the vacuum cleaner filter bag.

The invention furthermore provides a method for the manufacture of a vacuum cleaner filter bag, particularly of a vacuum cleaner filter bag as described above, which comprises pleating of at least a portion of the nonwoven web and assembling of the vacuum cleaner filter bag using the at least partially pleated nonwoven web.

The pleating can be carried out particularly by means of one or more knives. The pleating can result from the fact that a nonwoven web is guided between two profiled rolls. The profiles of the two rolls thereby engage in each other in such a way that longitudinal folds are formed in the machine direction. The nonwoven web consequently becomes more narrow as it passes through the gap, because folds form. A similar method is described, for example, in GB 1594700. A knife folding is discussed in DE 19713238.

Manufacturers of corresponding machines are, e.g., Solent Technology Inc., West Columbia, S.C., USA (solentech.com), Karl Rabofsky GmbH, Berlin (rabofsky.de) and Genuine Machine Design, Inc. (GMD), Indiana, USA (gmd-machinery.com).

The method can furthermore comprise a welding of transverse weld seams, whereby the transverse weld seams form edges of the vacuum cleaner filter bag. The folds of the at least partially pleated nonwoven material can be laid flat before the welding. In particular, the welding can take place in two steps, whereby the nonwoven material of the bag wall is compacted in a first step and the filter material is welded in a second step.

Fibres and/or absorbents can be arranged in a hollow space formed by the fixing device and the fold legs of at least one fold of the at least partially pleated nonwoven material. The fibres and/or absorbents can be introduced intermittently, so that the transverse weldings are left free.

The method can also comprise welding on a retaining plate. The surface area in which the retaining plate is welded on can particularly be free of folds of the at least partially pleated nonwoven material.

The area of the bag wall in which the retaining plate is welded on can be compacted before the retaining plate is welded on, for example, by means of ultrasonic welding. A foil can also be arranged on the bag wall in the interior of the vacuum cleaner filter bag, surrounding the inlet opening.

BRIEF DESCRIPTION OF THE DRAWINGS

Further characteristics and advantages of the invention are explained in the following on the basis of explanatory figures. Shown are.

DETAILED DESCRIPTION

The following methods are used for determining the parameters described above and in the following.

The air permeability is determined in accordance with DIN EN ISO9237:1995-12. In particular, work is carried out with a differential pressure of 200 Pa and a test area of 20 cm$^2$. The air permeability test device FX3300 of Texttest AG was used to determine the air permeability.

The mass per unit area is determined in accordance with DIN EN 29073-1:1992-08. The method according to the standard DIN EN ISO 9073-2:1997-02 is used for determining the thickness of one or more nonwoven layers, whereby method A is used.

The penetration (NaCl permeability) is determined by means of a TSI 8130 test device. In particular, 0.3 μm of sodium chloride is used at 86 l/min.

The fold width can be determined as the average distance between two adjacent folds, particularly between the fold backs of two abutting folds. If the folds are connected by means of a fixing element, the fold width can correspond to the average distance between the connection points of a first fold and the connection points of a second, adjacent fold.

The fold height of a fold can be determined as a normalized distance of the fold back to a plane in which the edges of the two fold legs lie that lie opposite the fold back. In the case of reclined folds, the fold height of a fold can be determined as the average length of the fold legs. For this purpose, the extension of a fold perpendicular to the longitudinal direction of the fold, meaning perpendicular to the direction in which the fold back runs, can be measured and the measured extension can be halved.

Figure 1:
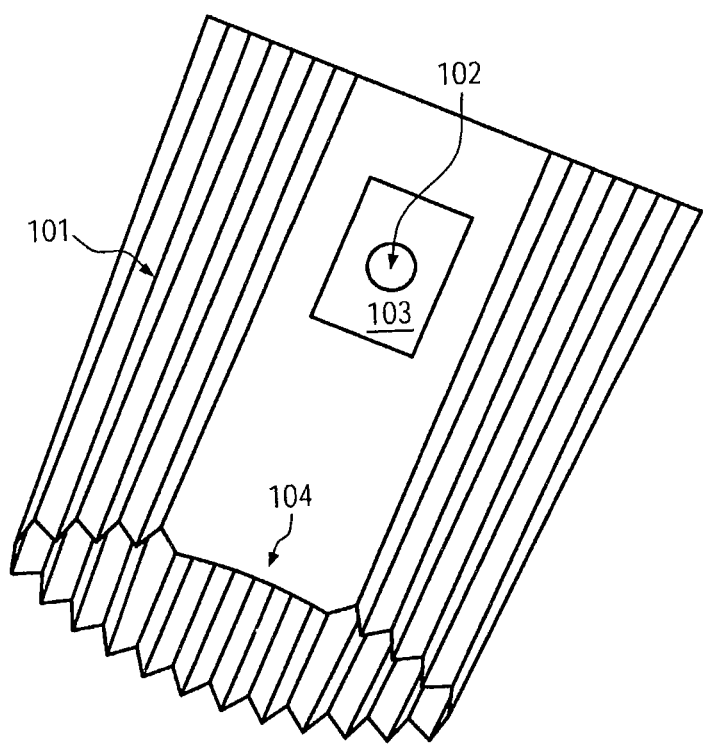
FIG. 1 an exemplary vacuum cleaner filter bag.

FIG. 1 shows an exemplary vacuum cleaner filter bag in which one side is shown opened for purposes of illustration. In fact, the side that is shown opened here is formed by a weld seam.

The exemplary vacuum cleaner filter bag of FIG. 1 comprises a bag wall of at least partially pleated nonwoven material. The at least partially pleated nonwoven material comprises a plurality of, particularly more than two, folds 101. The folds 101 are particularly upright folds.

The bag wall has no folds in the area 104. The nonwoven material is thus not pleated in this area 104. The exemplary vacuum cleaner filter bag of FIG. 1 furthermore comprises an inlet opening 102 through which the air that is to be cleaned can flow into the vacuum cleaner filter bag, as well as a retaining plate 103, that is used to fix the vacuum cleaner filter bag in a chamber of a vacuum cleaner, and a through hole in the area of the inlet opening 102.

The folds 101 of the partially pleated nonwoven material are formed along the entire length of the vacuum cleaner filter bag in the exemplary vacuum cleaner filter bag of FIG. 1. Depending on the orientation of the retaining plate 103, the vacuum cleaner filter bag can have a long side and a broad side. The folds 101 can extend along the long side or along the broad side, particularly along the entire long side or broad side.

In the case of the exemplary vacuum cleaner filter bag of FIG. 1, an area 104 of the bag wall is free of folds. Alternatively, folds of the at least partially pleated nonwoven material can, however, also be located on the entire bag wall.

The bag wall can particularly have two or more filter layers, whereby at least one layer comprises an at least partially pleated nonwoven material.

Figure 2:
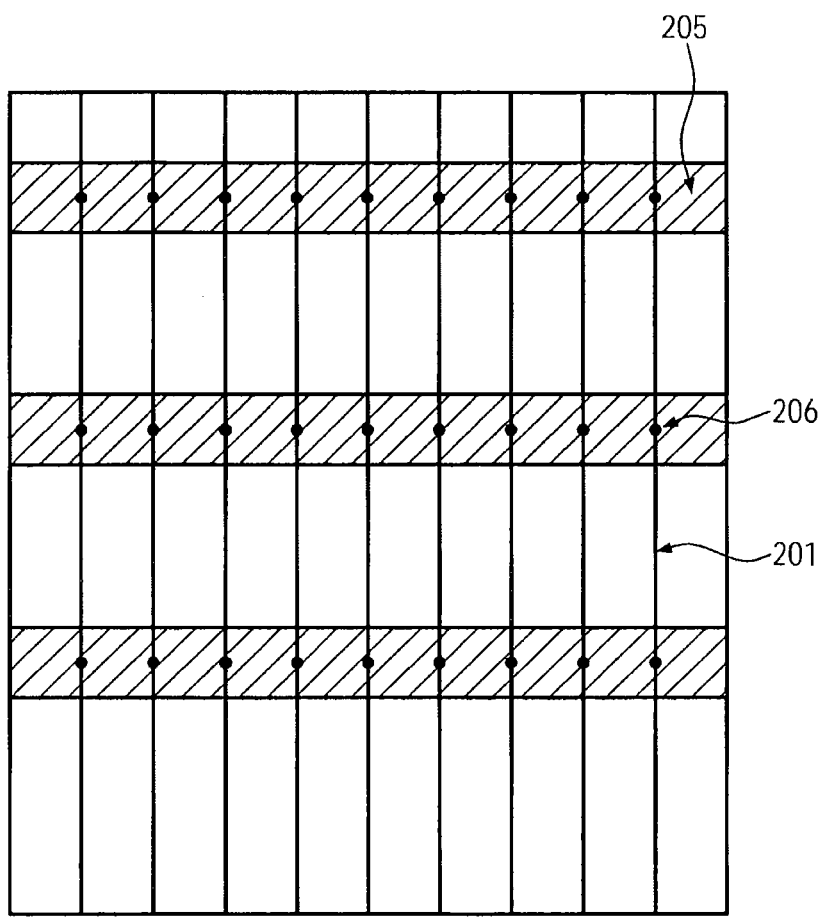
FIG. 2 a top view onto an interior of an exemplary vacuum cleaner filter bag.

FIG. 2 shows a top view onto an interior of a bag wall of an exemplary vacuum cleaner filter bag. The folds 201 of the at least partially pleated nonwoven material in this example are connected to one another by means of a fixing device in the form of a plurality of material strips 205. In particular, the folds 201 are held at a predetermined distance from one another by means of the material strips 205. In other words, the fold width of the folds 201 is fixed by the material strips 205. The material strips 205 are connected, for example, glued or welded, to the folds 201, particularly to an edge of the folds 201, at connection points 206.

The material strips 205 can, for example, have a width of from 0.5 cm to 4 cm, particularly from 1 cm to 3 cm, for example, 2 cm.

The material strips 205 can comprise a nonwoven material. In particular, the nonwoven material can comprise an extrusion nonwoven, for example, a spunbond nonwoven and/or a carded or air-laid nonwoven. The material strips 205 can also comprise a laminate of a plurality of nonwovens, particularly a laminate of spunbond nonwoven—meltblown nonwoven—spunbond nonwoven.

The mass per unit area of the material strips 205 can be less than 200 g/m$^2$, particularly between 10 g/m$^2$ and 30 g/m$^2$.

Some of the connection points 206 can be formed in such a way that the connection detaches during the operation of the vacuum cleaner filter bag. The flow behaviour of the air flowing into the bag can be influenced by means of the at least partially detached material strips 205.

The material strips 205 can also have a predetermined expansion behaviour. In this way, it is possible to achieve a predetermined extension of the bag during operation. The material strips 205 can also have elasticity, so that the extension of the bag can be reduced by elastic restoring forces again after operation, meaning after the vacuum cleaner has been switched off. In this way, dust can also be conveyed from the bag wall into the interior of the vacuum cleaner filter bag.

Alternatively to a plurality of material strips 205, the fixing element can also be formed as a material strip across the entire surface. In this case, the fixing element can have a high level of air permeability, particularly more than 5000 l/(m$^2$s).

The fixing element can also comprise an air-permeable paper, weave and/or foil. To increase the air permeability, the fixing device can also be perforated or slit.

Figure 3:
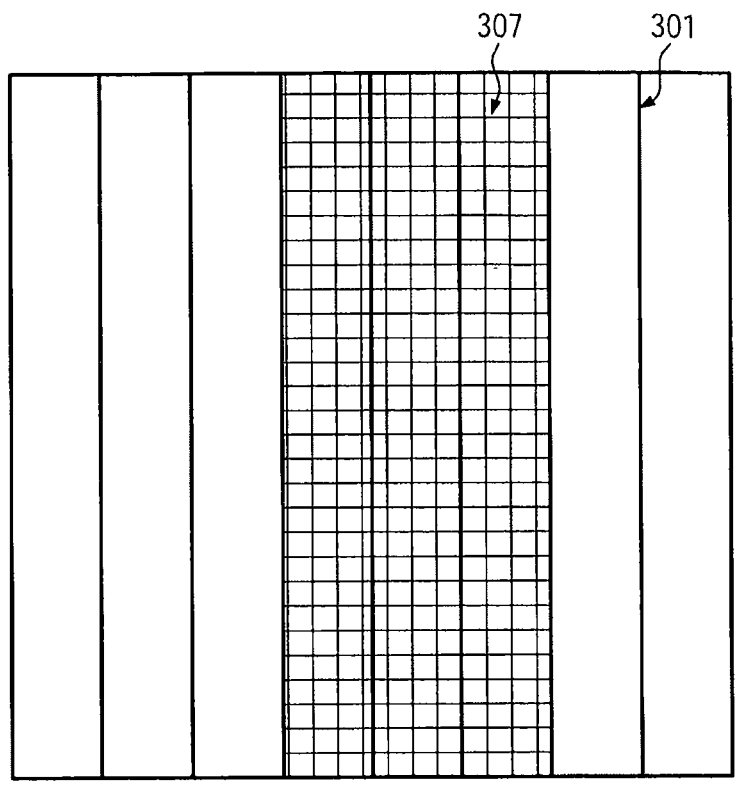
FIG. 3 a top view onto an interior of a further exemplary vacuum cleaner filter bag.

FIG. 3 shows a top view onto an interior of a bag wall of a further exemplary vacuum cleaner filter bag. In this case, the fixing device is formed in the form of a net 307 that connects the folds 301 of the pleated nonwoven material to one another in a subarea of the surface. In other areas of the surface, the folds of the pleated nonwoven material are not connected by the fixing device. By means of such a partial localization of the folds, it is possible to achieve an optimal fitting of the vacuum cleaner filter bag to the installation space of the vacuum cleaner during operation.

Figure 4:
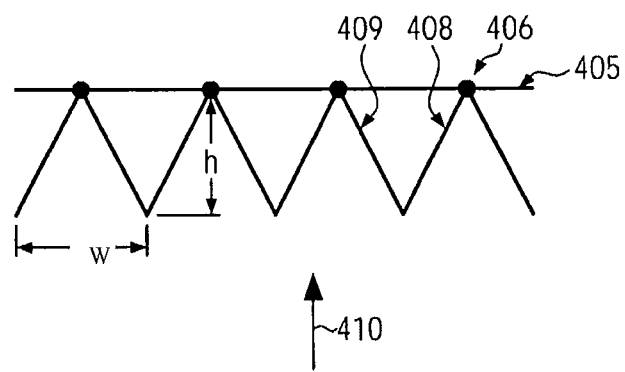
FIG. 4 a cross-section through a subarea of an exemplary vacuum cleaner filter bag.

FIG. 4 shows a cross-section through a subarea of the bag wall of an exemplary vacuum cleaner filter bag, whereby the cross-section runs perpendicularly to the run of the folds of the pleated nonwoven material. In particular, FIG. 4 shows a plurality of folds of the at least partially pleated nonwoven material of a bag wall of an exemplary vacuum cleaner filter bag that are connected to one another by means of a fixing device 405. In particular, the fixing device 405 is connected to the fold backs of the folds at connection points 406. The arrow 410 indicates the direction of flow of the air that is to be cleaned toward the bag wall. In this example, the fixing device 405 is consequently arranged on the downstream side of the at least partially pleated nonwoven material.

FIG. 4 furthermore shows a fold leg 409 of a first fold and a fold leg 408 of a second fold that are directly adjacent to each other or that abut each other.

FIG. 4 furthermore illustrates the fold width w (b) and the fold height h. The fold height h and/or the fold width w (b) can lie between 3 mm and 100 mm, particularly between 5 mm and 15 mm.

Figure 5:
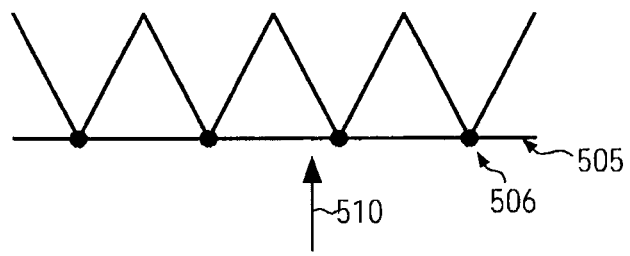
FIG. 5 a cross-section through a subarea of a further exemplary vacuum cleaner filter bag.

FIG. 5 shows a further cross-section through a part of a bag wall of an exemplary vacuum cleaner filter bag. In particular, a plurality of folds 501 are shown, and a fixing device 505 arranged on the upstream side with reference to the direction of flow 510, whereby the folds 501 are connected to the fixing device 505 at connection points 506.

In FIGS. 4 and 5, the folds have a cross-section in the shape of an isosceles triangle. The shape of the folds can be chosen arbitrarily, however.

Figure 6:
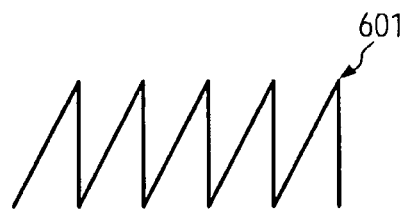
FIG. 6 a cross-section through a subarea of a further exemplary vacuum cleaner filter bag.

FIG. 6, for example, shows a cross-section through a subarea of a bag wall of an exemplary vacuum cleaner filter bag, in which the folds 601 have fold leg lengths that are different in the cross-section.

In particular when a full-surface, air-permeable fixing device is used for fixing the folds, the hollow spaces formed between the folds and the fixing device can be filled with fibres, particularly electrostatically charged fibres, and/or with absorbents. For example, coated fibres, activated charcoal and/or porous polymers can be used as absorbents.

Figure 7:
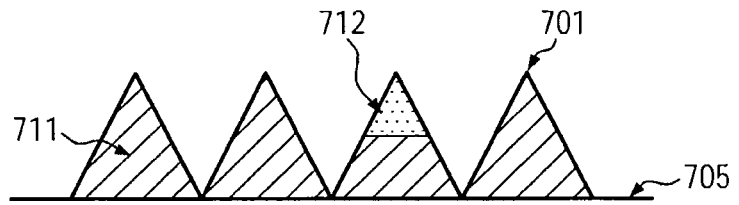
FIG. 7 a cross-section through a subarea of a further exemplary vacuum cleaner filter bag.

FIG. 7 shows a cross-section of a subarea of such a bag wall. In particular, a plurality of folds 701 and a fixing device 705 connected to them are shown. Fibres 711 and/or activated charcoal 712 are arranged in the hollow spaces between the fold legs and the fixing device 705.

Figure 8:
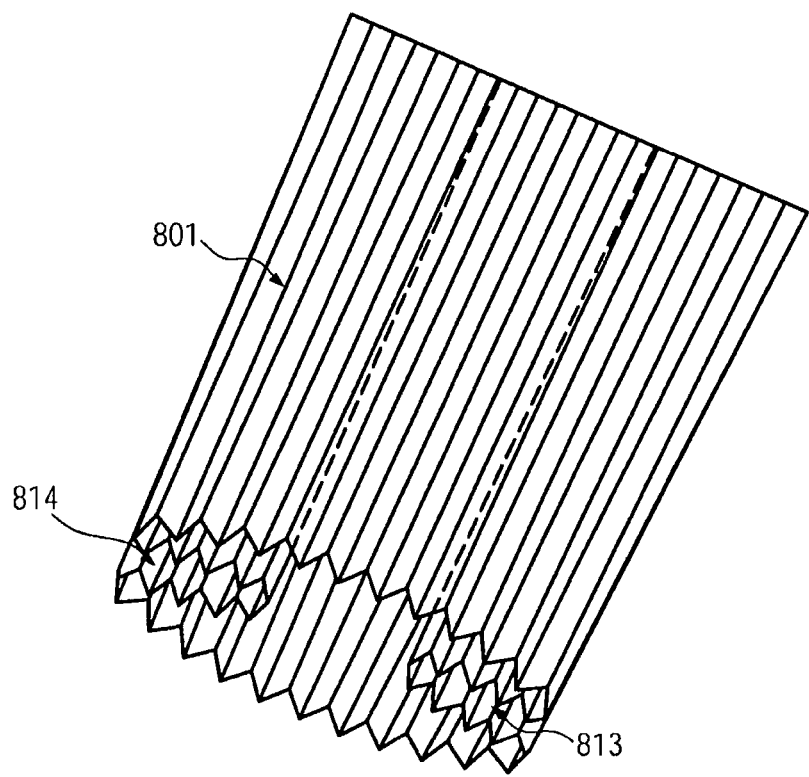
FIG. 8 a top view onto the back side of an exemplary vacuum cleaner filter bag.

FIG. 8 shows an exemplary vacuum cleaner filter bag, particularly in a top view on to an outer side of the vacuum cleaner filter bag. The bag wall comprises a multitude of folds 801. The vacuum cleaner filter bag furthermore comprises two side folds 813 and 814, whereby the side folds 813 and 814 likewise comprise an at least partially pleated nonwoven material. In other words, folds 801 of the at least partially pleated nonwoven material are arranged on the fold legs of the side folds 813 and 814, respectively. It can be possible for the side folds 813 and 814 to be partially or completely turned out.

Due to the use of an at least partially pleated nonwoven material, the surface available for filtration can be enlarged given predetermined dimensions of the vacuum cleaner filter bag. This leads to a high filtration performance with a low starting pressure loss. This means a lower media passage speed, which increases the filtration performance, particularly by means of electrostatically-charged fibres of the bag wall.

Figure 9:
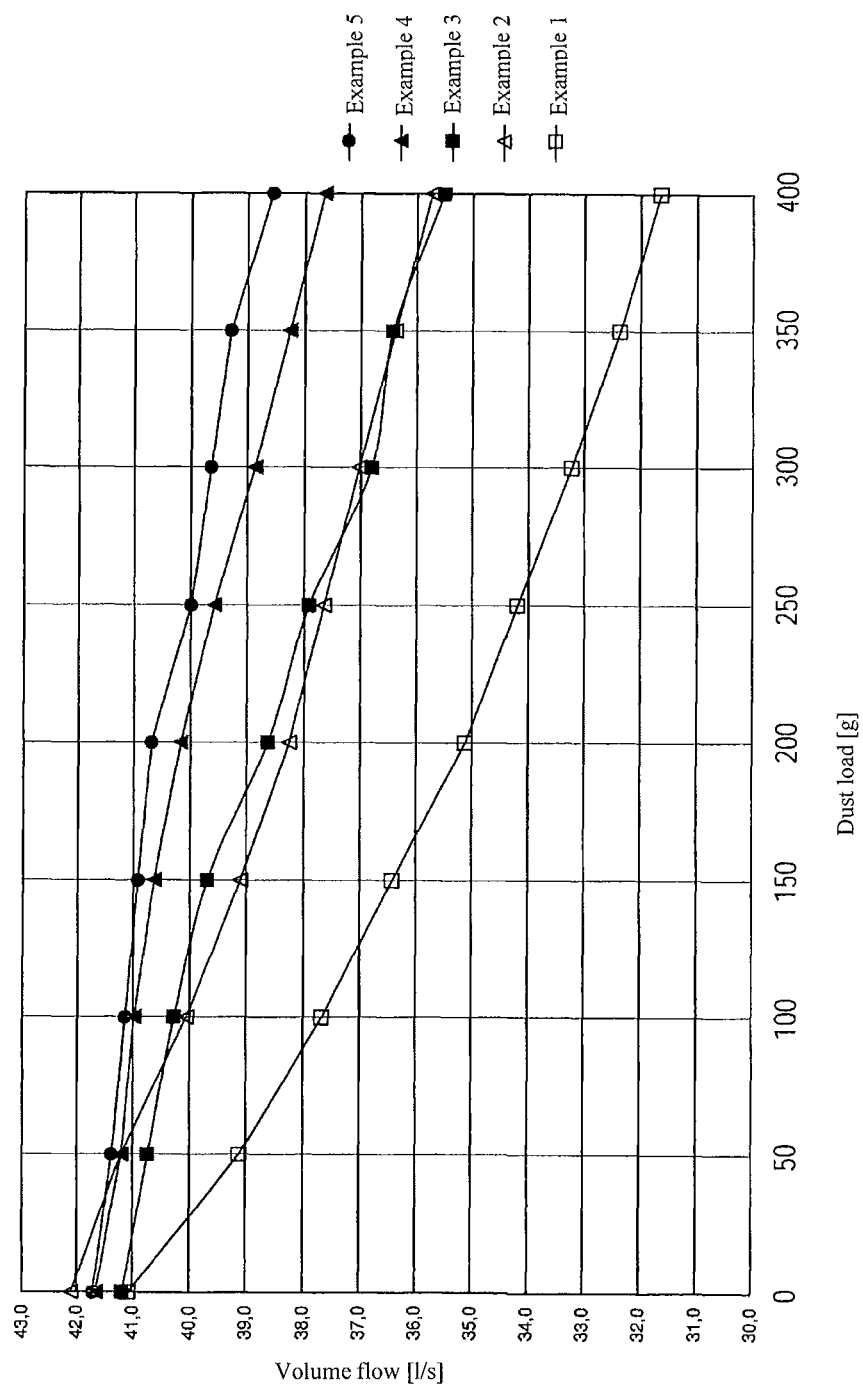
FIG. 9 an illustrative diagram in which the volume flow through the bag wall of exemplary vacuum cleaner filter bags in dependence on the dust mass stored therein is depicted.

Due to the greater surface, it is also possible to achieve a greater dust-holding capacity. FIG. 9 is used for illustration purposes, and shows a diagram in which the volume flow through the bag wall of vacuum cleaner filter bags is depicted in dependence on the dust load in grams. Each bag wall consists of a laminate made of spunbond nonwoven and meltblown nonwoven. The corresponding measurements were made with a "Miele S 5210" model vacuum cleaner.

Example 1

Corresponds to a bag wall according to the state of the art, meaning without an at least partially pleated nonwoven material. The bag dimensions are (L×W) 300 mm×320 mm. The SMMS consists of spunbond 35 g/m$^2$, 2×20 g/m$^2$ meltblown nonwoven and spunbond 17 g/m$^2$.

Example 2

Corresponds to a bag wall comprising a fully pleated nonwoven material. The fold height is 12 mm. The bag dimensions (L×W) amounted to 300×630 mm (unfolded). The SMMS consists of spunbond 35 g/m$^2$, 2×20 g/m$^2$ meltblown nonwoven and spunbond 17 g/m$^2$.

Example 3

Corresponds to a bag wall according to the invention comprising a fully pleated nonwoven material and a fixing device formed across the entire surface in the form of a net with a mesh width of 5 mm×5 mm. The fold height is 12 mm. The bag dimensions were (L×W) 300×630 mm (unfolded). The SMMS consists of spunbond 35 g/m$^2$, 2×20 g/m$^2$ meltblown nonwoven and spunbond 17 g/m$^2$.

Example 4

Corresponds to a bag wall according to the invention comprising a fully pleated nonwoven material and a fixing device in the form of a plurality of nonwoven strips (each 20 mm wide) spaced apart from one another. The fold height is 12 mm. The bag dimensions (L×W) amounted to 300×630 mm (unfolded). The SMMS consists of spunbond 35 g/m$^2$, 2×20 g/m$^2$ meltblown nonwoven and spunbond 17 g/m$^2$.

Example 5

Corresponds to a bag wall according to the invention comprising a fully pleated nonwoven material and a fixing device in the form of a plurality of nonwoven strips (each 20 mm wide) spaced apart from one another. The fold height is 12 mm. The bag dimensions (L×W) amounted to 300×630 mm (unfolded). The SMMS consists of spunbond 35 g/m$^2$, 2×20 g/m$^2$ meltblown nonwoven and spunbond 17 g/m$^2$. The vacuum cleaner filter bag according to Example 5 additionally comprises at least one element for flow deflection or flow distribution (14 strips, each 11 mm wide, laminate with a mass per unit area of 110 g/m$^2$) in the vacuum cleaner filter bag.

As can be seen in FIG. 9, the vacuum cleaner filter bags with a bag wall comprising an at least partially pleated nonwoven material have, also at high dust loads, a greater volume flow than a vacuum cleaner filter bag with a bag wall without pleated nonwoven material.

Due to the greater dust-holding capacity, the pressure loss increase of the vacuum cleaner filter bag can also be reduced.

Table 1 lists average values (from five measurements) of the measured pressure loss and of the measured penetration of a vacuum cleaner filter bag material according to the state of the art with a bag wall made of a laminate of a spunbond nonwoven (mass per unit area 35 g/m$^2$), 2 layers of meltblown nonwoven (mass per unit area of each is 20 g/m$^2$) and a spunbond nonwoven (mass per unit area 17 g/m$^2$).

TABLE 1

| Measured with TSI 8130 | Volume flow [l/min] | Pressure loss ΔP [mm H$_2$O] | Penetration [%] |
|---|---|---|---|
| Average values | 86.92 | 14.46 | 32.2 |

Table 2 lists average values (from five measurements) of the measured pressure loss and of the measured penetration of a vacuum cleaner filter bag with a bag wall made of a pleated laminate of a spunbond nonwoven (mass per unit area 35 g/m$^2$), 2 layers of meltblown nonwoven (mass per unit area of each is 20 g/m$^2$) and a spunbond nonwoven (mass per unit area 17 g/m$^2$).

TABLE 2

| Measured with TSI 8130 | Volume flow [l/min] | Pressure loss ΔP [mm H$_2$O] | Penetration [%] |
| --- | --- | --- | --- |
| Average values | 42.98 | 6.86 | 18.72 |

As can be seen in Tables 1 and 2, the pressure loss and the penetration in the case of a vacuum cleaner filter bag with an at least partially pleated bag wall are considerably less than in the case of known vacuum cleaner filter bags without a pleated bag wall.

Table 3 lists average values (from two measurements) of the measured pressure loss and of the measured penetration of a vacuum cleaner filter bag according to the state of the art with a bag wall made of an HEPA laminate of a spunbond nonwoven (mass per unit area 35 g/m$^2$), 4 layers of meltblown nonwoven (each with a mass per unit area of 19 g/m$^2$) and a spunbond nonwoven (mass per unit area 17 g/m$^2$).

TABLE 3

| Measured with TSI 8130 | Volume flow [l/min] | Pressure loss ΔP [mm H$_2$O] | Penetration [%] |
| --- | --- | --- | --- |
| Average values | 86.1 | 32.05 | 0.025 |

Table 4 lists average values (from two measurements) of the measured pressure loss and of the measured penetration of a vacuum cleaner filter bag with a pleated bag wall made of an HEPA laminate of a spunbond nonwoven (mass per unit area 35 g/m$^2$), 4 layers of meltblown nonwoven (each with a mass per unit area of 19 g/m$^2$) and a spunbond nonwoven (mass per unit area 17 g/m$^2$).

TABLE 4

| Measured with TSI 8130 | Volume flow [l/min] | Pressure loss ΔP [mm H$_2$O] | Penetration [%] |
| --- | --- | --- | --- |
| Average values | 43.05 | 15.5 | 0.004 |

As can be seen in Tables 3 and 4, the pressure loss and the penetration in the case of a vacuum cleaner filter bag with an at least partially pleated bag wall are considerably less than in the case of known vacuum cleaner filter bags without a pleated bag wall. The reduction in the penetration is disproportionately more pronounced in the case of the HEPA laminate than in the laminate used in Tables 1 and 2.

In Tables 1 and 2 and in Tables 3 and 4, respectively, it is also possible to detect a lower volume flow for a bag wall made of a pleated nonwoven material due to the greater surface of such a bag wall.

It shall be understood that characteristics mentioned in the previously described embodiments are not limited to these special combinations and are also possible in any other combinations. In particular, the vacuum cleaner filter bag can be formed with different geometric shapes and/or sizes.

The invention claimed is:

1. A vacuum cleaner filter bag formed as a flat bag and comprising:
    a bag wall made of filter material that has a through passage through which the air that is to be cleaned can flow into the vacuum cleaner filter bag,
    the bag wall consisting of an at least partially pleated nonwoven material, and
    comprising a first and a second filter material layer that are connected to each other by a peripheral weld seam,
        wherein the first or the second filter material layer consists of the at least partially pleated nonwoven material;
        wherein folds of the at least partially pleated nonwoven material are connected to one another at least partially by a fixing device;
        wherein the fixing device is configured to hold the folds of the at least partially pleated nonwoven material at a predetermined distance from one another when the vacuum cleaner filter bag is unfolded during operation of the vacuum cleaner filter bag; and
        wherein the fixing device is arranged on a first side of the at least partially pleated nonwoven material facing towards an interior of the vacuum cleaner filter bag and a second side of the at least partially pleated nonwoven material on an exterior of the vacuum cleaner filter bad is free from any fixing device.

2. The vacuum cleaner filter bag according to claim 1, wherein folds of the at least partially pleated nonwoven material extend across the entire length or width of the vacuum cleaner filter bag.

3. The vacuum cleaner filter bag according to claim 1, wherein folds of the at least partially pleated nonwoven material have a fold height between 3 mm and 100 mm.

4. The vacuum cleaner filter bag according to claim 1, wherein folds of the at least partially pleated nonwoven material have a fold width between 3 mm and 100 mm.

5. The vacuum cleaner filter bag according to claim 1, wherein at least two folds of the at least partially pleated nonwoven material have fold heights or fold widths that are different from each other.

6. The vacuum cleaner filter bag according to claim 1, further comprising at least one side fold, wherein the at least partially pleated nonwoven material is arranged in the at least one side fold.

7. The vacuum cleaner filter bag according to claim 1, wherein at least two folds of the at least partially pleated nonwoven material have fold shapes that differ from one another.

8. The vacuum cleaner filter bag according to claim 1, wherein the fixing device is glued or welded at least partially to folds of the at least partially pleated nonwoven material.

9. The vacuum cleaner filter bag according to claim 1, wherein the fixing device comprises at least one material strip.

10. The vacuum cleaner filter bag according to claim 1, wherein the fixing device has a predetermined expansion behaviour.

11. The vacuum cleaner filter bag according to claim 1, wherein fibres or absorbents are arranged in the hollow space formed by the fixing device and fold legs of at least one fold of the at least partially pleated nonwoven material.

12. The vacuum cleaner filter bag according to claim 1, wherein folds of the at least partially pleated nonwoven material have a fold height between 5 mm and 15 mm.

13. The vacuum cleaner filter bag according to claim 1, wherein folds of the at least partially pleated nonwoven material have a fold width between 5 mm and 15 mm.

14. The vacuum cleaner filter bag according to claim 1, wherein the fixing device comprises at least one nonwoven material strip.

15. The vacuum cleaner filter bag according to claim 1, wherein the fixing device is formed such that a fold width of the folds connected by the fixing device can be enlarged during operation of the vacuum cleaner filter bag by expanding the fixing device.

16. A method for manufacturing a vacuum cleaner filter bag, the vacuum cleaner bag being formed as a flat bag and comprising a bag wall made of filter material that has a through passage through which the air that is to be cleaned can flow into the vacuum cleaner filter bag, the bag wall consisting of an at least partially pleated nonwoven material, and a first and a second filter material layer that are connected to each other by a peripheral weld seam, wherein the first or the second filter material layer consists of the at least partially pleated nonwoven material, the method comprising:

pleating of at least a portion of a nonwoven web;

assembling of the vacuum cleaner filter bag using the at least partially pleated nonwoven web; and connecting folds of the at least partially pleated nonwoven material to one another at least partially by a fixing device;

wherein the fixing device is configured to hold the folds of the at least partially pleated nonwoven material at a predetermined distance from one another when the vacuum cleaner filter bag is unfolded during operation of the vacuum cleaner filter bag; and wherein the fixing device is arranged on a first side of the at least partially pleated nonwoven material facing towards an interior of the vacuum cleaner filter bag and a second side of the at least partially pleated nonwoven material on an exterior of the vacuum cleaner filter bag is free from any fixing device.

\* \* \* \* \*

UNITED STATES PATENT AND TRADEMARK OFFICE
CERTIFICATE OF CORRECTION

| | |
|---|---|
| PATENT NO. | : 10,188,248 B2 |
| APPLICATION NO. | : 13/635089 |
| DATED | : January 29, 2019 |
| INVENTOR(S) | : Ralf Sauer et al. |

Page 1 of 1

It is certified that error appears in the above-identified patent and that said Letters Patent is hereby corrected as shown below:

On the Title Page

Abstract
Item (57), in the second to the last line, immediately after "rial layers" and immediately before "include", please delete "comprise".

Signed and Sealed this
Twenty-first Day of April, 2020

Andrei Iancu
*Director of the United States Patent and Trademark Office*